June 16, 1964     J. M. BARNETT     3,137,177
SHEAVE AND METHOD OF FABRICATING THE SAME
Filed May 14, 1962
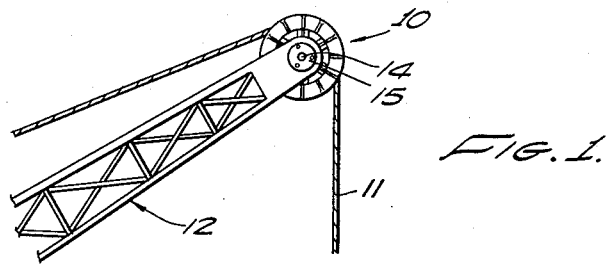
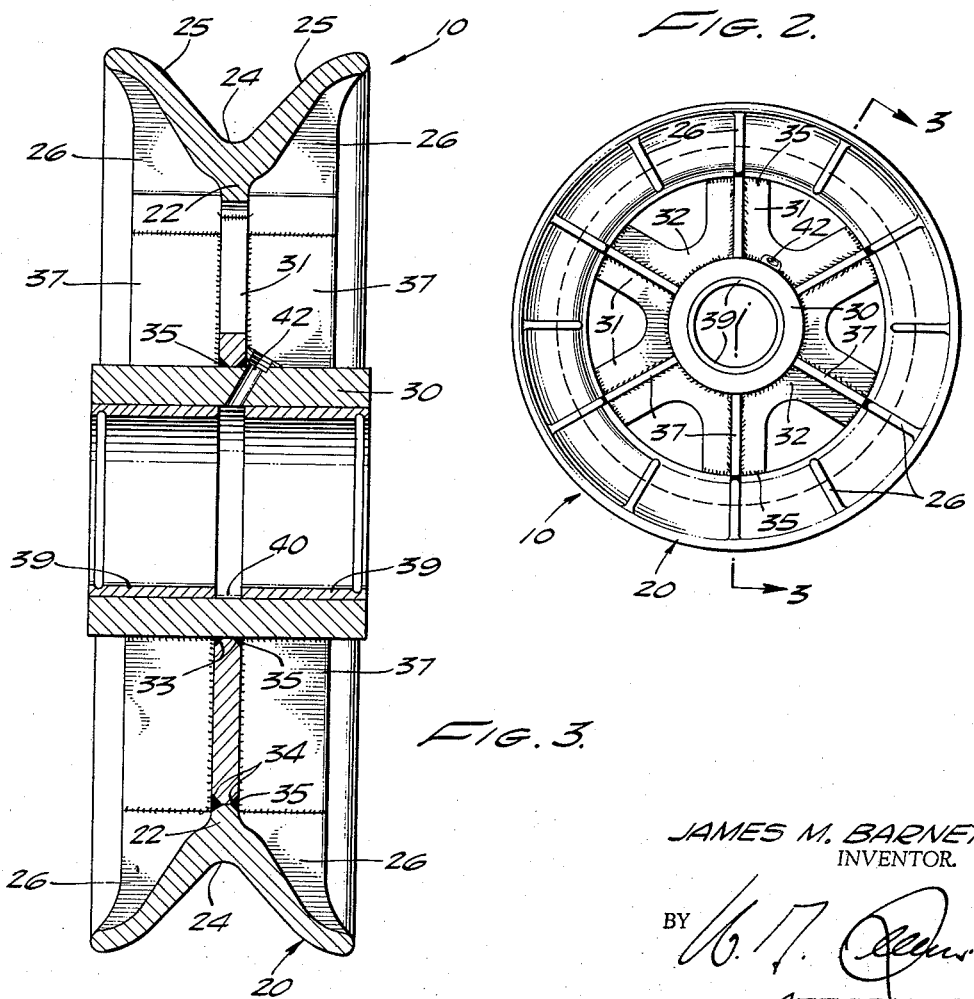
JAMES M. BARNETT
INVENTOR.
BY
ATTORNEY

3,137,177
SHEAVE AND METHOD OF FABRICATING THE SAME
James M. Barnett, 1905 Los Robles, San Marino, Calif.
Filed May 14, 1962, Ser. No. 194,555
3 Claims. (Cl. 74—230.3)

This invention relates to wire line sheaves used in handling heavy loads, and more particularly to an improved composite sheave and to a method of fabricating the same to lower cost, to provide longer trouble-free service life, maximum strength and greater wearing qualities.

Sheaves are commonly used in pulley blocks and as wire line supports in a great variety of hoisting and load handling equipment. Such sheaves are commonly found to be one of the critical components of very heavy equipment and are mounted in locations where it is difficult and costly to perform service and repair operations. The flexing of the heavy duty wire cables while under load and trained over the seating groove of the sheave subjects the wire contacting surfaces of the groove to brutal abrasion treatment. In consequence, it is found that such sheaves deteriorate rapidly in service.

For these reasons extensive studies have been conducted in efforts to provide more economical sheaves capable of longer trouble-free service. These efforts have met with only partial and quite unsatisfactory success. A great variety of materials and alloys have been proposed and of these manganese steel has been found quite satisfactory except for its extremely high cost. This is due in part to the high cost of the material itself and in part to the extreme difficulty and high cost of machining this material in respects heretofore necessary in preparing the sheave for mounting in its place of use. These difficulties and the high cost of the material itself have prevented its use except in applications where cost is of secondary importance.

Among other proposals for fabricating wire line sheaves to obtain longer service life is that of rolling the wire line seating groove from continuous strip stock in a manner to deform this strip into a ring of U-shape cross section. Formation of such a ring requires repeated passage through suitable forming rollers accompanied by intervening annealing operations. Once the ring has been formed, its adjacent ends must be welded together and machined to size. Thereafter it is necessary to subject the completed rim to surface hardening techniques, as by flame treatment. Later the finished ring is assembled to the supporting spoke and hub assembly. This complicated procedure is not only time consuming and costly to perform but precludes the use of manganese steel for the rim ring.

The foregoing and other shortcomings of prior sheaves and the mode of fabricating the same are completely avoided by the present invention featuring a sheave of composite construction composed of different metals held assembled by welding. The composite sheave includes a cast annular ring of manganese steel having an inwardly projecting annular flange coincident with the transverse medial plane of the ring. The supporting structure for this ring preferably comprises a concentric hub rigidly connected to this annular flange by one-piece spoke unit welded to the hub and to the annular flange of the cast rim unit. Desirably the spokes, for maximum strength, include reinforcing radial ribs interposed between the hub and the manganese ring along both faces of the spoke unit. The manganese ring is accurately cast to shape without need for machining in most instances and then only as may be desirable to provide a truer running surface for the wire line, particularly for higher speed operations. Desirably the spoke unit is formed in one-piece from thick steel plate stock and the spoke reinforcing members are cut from continuous strip steel stock.

Accordingly, it is a primary object of this invention to provide an improved long-life composite wire line sheave featuring a cast maganese steel rim ring and a supporting spoke and hub structure of mild steel components welded to one another and to the rim ring and, additionally, to a method of fabricating such a composite sheave.

Another object of the invention is to provide an improved composite sheave having a manganese rim ring which can be readily replaced by a substitute rim ring should the original one become damaged or unserviceable.

Another object of the invention is the provision of a wire line sheave having a rim structure formed in one piece of cast manganese steel supported by a readily machineable hub assembly of relatively inexpensive material.

Another object of the invention is the provision of a composite heavy duty wire line sheave having a unitary rim ring cast from manganese steel and so formed as not to require machining or other finishing operation before or after being welded to a supporting hub structure.

Another object of the invention is the provision of a heavy duty wire line sheave in which the rim ring is cast in one piece from manganese steel and held assembled by welding to a concentrically related hub and spoke assembly of relatively inexpensive, but high strength materials.

These and other more specific objects will appear upon reading the following specification and claims and upon considering in connection therewith the attached drawings to which they relate.

Referring now to the drawings in which preferred embodiments of the invention are illustrated:

FIGURE 1 is a fragmentary side elevational view of a conventional derrick having the composite sheave of the present invention mounted therein supporting a wire line;

FIGURE 2 is an enlarged side elevational view of the composite sheave according to the present invention; and, FIGURE 3 is a transverse sectional view on an enlarged scale taken along the broken line 3—3 on FIGURE 2 showing constructional details.

Referring to FIGURE 1, there is a preferred embodiment of a composite sheave designated generally 10 and incorporating the features of this invention. As is well known by persons skilled in this art, large numbers of such sheaves are used in various operating environments as, for example, to support a wire line 11 in the outer end of derrick boom 12. For this purpose, the outer end of boom 12 is bifurcated to receive sheave 10 which is supported rotatably therein on a horizontally disposed shaft 14 having its opposite ends journalled in bearing assemblies 15 secured to the boom structure.

Constructional details of sheave 10 are best shown in FIGURES 2 and 3. Rim ring 20 comprises a one-piece ring having a suitable cross sectional contour, such as the flaring V-shape indicated in FIGURE 3. Ring 20 is cast in conventional manner from Hadfield manganese steel and features a radially short continuous annular flange 22 projecting inwardly directly beneath the wire line seating groove or surface 24 This seating surface has a curvature transversely of the groove corresponding generally to the radius of the wire line for which the sheave is designed. The surfaces 25, 25 to either side of seating surface 24 diverge outwardly and are effective to maintain the wire line seated in the groove imposed by varying operating conditions, and sway of the load and the like. It will be understood that the cross sectional contour of rim ring 20 and particularly of the wire line seating groove may vary widely depending on the particular application, the size of the wire line, design limitations, the space available, and other related factors well known to designers of sheaves.

In the interest of economy, weight saving and maximum strength, it is desirable that the opposite exterior faces of the rim ring be provided with integral radially-disposing reinforcing ribs 26, 26 uniformly distributed as best shown in FIGURE 2. The radial remote edges are spaced inwardly of the lateral edges of the ring for manifest reasons and the inner edges preferably lie substantially parallel to the sheave axis although these edges may be inclined to this axis if so desired.

The supporting spoke and hub unit for the rim ring preferably take the form shown in FIGURES 2 and 3 and include a tubular cylindrical member 30 and a suitable number of spokes 31 arranged radially between the exterior of the hub and the inner periphery of the annular flange 22. It will be understood that in certain applications it may be desirable to mount the sheave on a live axle which may or may not be integral with the hub proper. For maximum strength, simplicity of assembly and cost of manufacture, spokes 31 are preferably integral at their inner ends 32 and are formed in one-piece from a plate of heavy rolled mild steel. A single ring of plate steel having a central opening sized to fit about hub 30 may be secured to a jig following which V-shaped cutouts are severed therefrom to form the individual spokes 31 in any suitable manner as by flame cutting technique, bandsaw, or other metal cutting techniques. Both the outer and inner peripheral edges of spoke unit 31 are beveled as indicated at 33, 34 in FIGURE 3 to provide for the reception of welding metal 35. It is also desirable that the inner edges of annular flange 22 be cast with bevels corresponding to the adjacent bevels 34 thereby further facilitating the welding operation and the formation of a high strength welded joint.

For additional strength, the opposite sides of spoke assembly 31 are desirably further and suitably reinforced as for example, by radial strips 37 of thick mild steel stripping appropriately sized to fit snugly between hub 30 and the interaxial edges of reinforcing ribs 26 of rim ring 20. It will be understood that in certain constructions, particularly in the case of larger sheaves, the spoke assembly may comprise individual spokes of any suitable design.

The internal surface of hub 30 is appropriately machined and provided with bearing sleeves 39 of babbitt, bronze or other bearing material. Desirably, the adjacent inner ends of sleeves 39 are spaced apart sufficiently to provide a reservoir groove 40 for grease or other lubricant which may be replenished from time to time through charging bore 42 threaded at its outer end to mount a grease receiving fitting, not shown.

The fabrication of the described sheave will be easily understood from the foregoing detailed description of its components and their relationship to one another. Rim ring 20 is cast from manganese steel by well known casting techniques. This ring is ready for assembly as soon as cast and suitably heat treated in accordance with known technique without need, except as hereinabove noted, for machining or finishing operations of any kind. This is highly important both from a cost savings as well as from a service viewpoint. The one-piece spoke unit 31 is cut from heavy-duty mild steel plate in the manner described above and its inner and outer rim edges are made concentric to one another in any suitable manner such that the outer ends of the spokes fit snugly within annular flange 22 of the rim ring and the inner opening fits snugly about hub cylinder 30. These components are then placed in a suitable holding jig supporting hub 30 accurately concentric with the wire line seating surface 24 and with rim ring 20 positioned centrally between the opposite ends of the hub. While so held, the spoke unit is welded at 35 to the hub and to flange 22 of rim ring 20. Thereafter the reinforcing strips 37 are welded into place.

There remains but to finish machine the bore and face surfaces of the hub unit and to insert the bearing sleeves 39.

In the use of the described sheave after mounting it in a pulley block, in a derrick boom, or the like, operating environment, it will be understood that the passage of a highly loaded wire line 11 over the sheave causes repeated cold flow of the manganese surfaces in contact with the wire line. The surface 24 is thereby cold worked by the very high load concentrations imposed by the twisted wires constituting wire line 11 and this working greatly enhances the greatly superior abrasion resistance of cast metal and particularly that of cast manganese steel. The same work hardening process occurs along surfaces 25 to either side of groove 24 due to wiping of the wire line past these surfaces particularly during side sway from the wire line below the outer end of the derrick boom.

While the particular sheave and method of fabricating the same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein-shown other than as defined in the appended claims.

I claim:

1. An inexpensive composite wire line sheave comprising a one-piece continuous manganese steel rim ring cast in finished form requiring no finishing operations, said rim ring having a main body of generally V-shape in cross section and providing a deep outwardly opening radial groove for a wire line free of welds extending thereacross and having outwardly flaring interior side walls, said main body having an inwardly projecting annular flange lying midway between the sides of said main body, a cylindrical hub structure of easily machined mild steel having its axis coincident with the axis of said rim ring and having the opposite ends projecting axially beyond the opposite sides of said rim ring, and a plurality of high strength strip metal spokes formed from mild rolled steel distributed about said hub with their ends welded respectively to said hub and to the inner edge of said annular flange, the radial axes of said spokes lying in a plane bisecting the medial radial plane passing through said rim ring for maximum strength and effectiveness in supporting heavy loads imposed on said rim ring in the normal use of said sheave.

2. A wire line sheave as defined in claim 1 characterized in that the inner ends of said spokes are integral with one another and are adapted to be assembled as a one-piece unit between said rim ring and said hub structure.

3. An inexpensive composite wire line sheave comprising a one-piece continuous manganese steel rim ring cast in finished form requiring no finishing operations, said rim ring having a main body of generally V-shape in cross section and providing a deep outwardly opening radial groove for a wire line with outwardly flaring side walls, said cast main body having a plurality of integral radial ribs on either underside thereof having their remote lateral edges spaced apart a distance not in excess of the axial width of said rim ring, an annular rib integral with said rim ring and projecting radially inwardly a short distance along a medial bisector plane through the center of said rim ring, a hub assembly for said sheave comprising a cylindrical hub member concentric with said rim ring and of very substantially smaller diameter, rolled steel plate members interposed radially between said hub member and said rim ring, some of said rolled steel plate members lying in a medial plane through said annular rib and normal to the sheave axis and other of said rolled steel plate members lying in radial planes passing through the axis of said sheave and disposed on either opposite side of said first mentioned steel plate members with their inner ends welded to said hub and their outer ends welded to the inner ends of said radial ribs integral with the inner side of said manganese rim ring, and all of said rolled steel plate members being welded together between their juxtaposed surfaces.

References Cited in the file of this patent

UNITED STATES PATENTS

| | | |
|---|---|---|
| 403,326 | Burridge | May 14, 1889 |
| 2,730,795 | Bloss | Jan. 17, 1956 |
| 2,995,044 | Abel | Aug. 8, 1961 |